W. H. KEEN.
APPARATUS FOR TESTING THE HARDNESS OF METALS.
APPLICATION FILED MAR. 21, 1913.
1,071,430.   Patented Aug. 26, 1913.
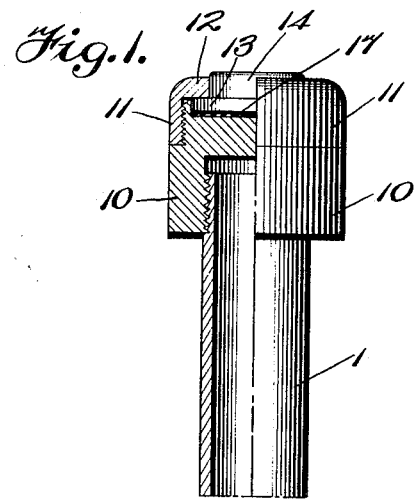
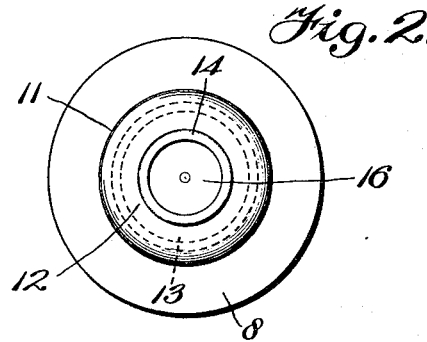
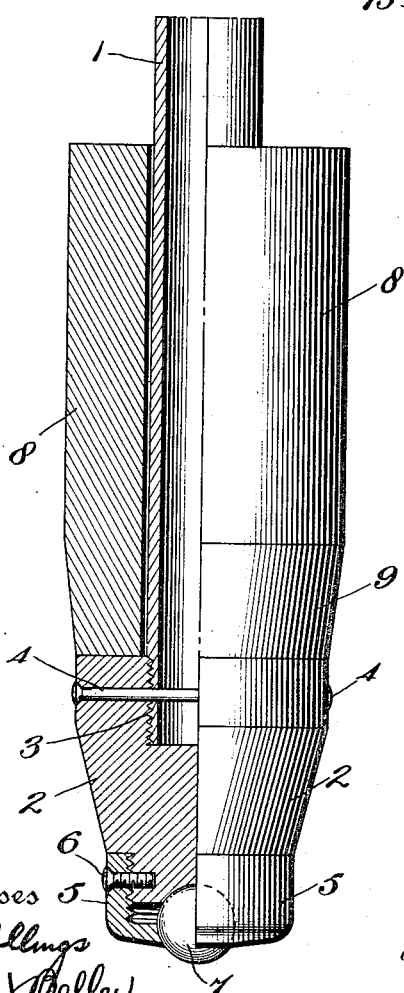
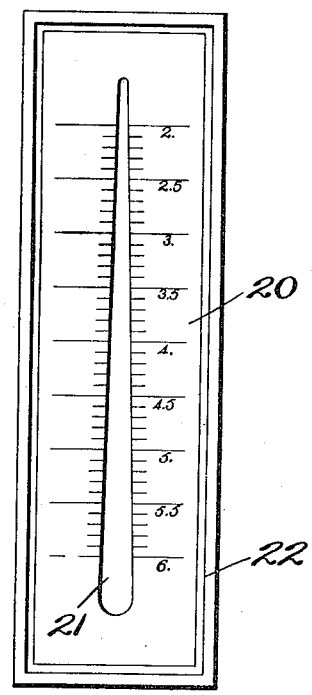
Witnesses
Byron B. Collings
Edwin J. Beller
Inventor
William H. Keen
by Wilkinson, Witherspoon & Mackay
Attorneys

UNITED STATES PATENT OFFICE.

WILLIAM HERBERT KEEN, OF WASHINGTON, DISTRICT OF COLUMBIA.

APPARATUS FOR TESTING THE HARDNESS OF METALS.

1,071,430.　　　　　　Specification of Letters Patent.　　Patented Aug. 26, 1913.

Application filed March 21, 1913. Serial No. 756,003.

*To all whom it may concern:*

Be it known that I, WILLIAM HERBERT KEEN, a citizen of the United States, residing at Washington, in the District of Columbia, have invented certain new and useful Improvements in Apparatus for Testing the Hardness of Metals; and I do hereby declare the following to be a full, clear, and exact description of the invention, such as will enable others skilled in the art to which it appertains to make and use the same.

My invention relates to improvements in apparatus for testing the hardness of metals, and other materials.

The apparatus comprises a weight arranged to drop perpendicularly, sliding on a rod as a guide, from a prescribed height so as to deliver a blow of constant magnitude on a socket, in which is mounted a hardened steel ball, which ball is capable of revolving, thus affording always a spherical surface. The force of the blow on the ball drives the latter into the metal to be tested. The hardness varies inversely as the area of the surface of the spheroidal indentation. As this surface necessarily varies proportional to the diameter of the indentation, we have adopted the measurement of the diameter of the indentation as the measure of hardness, the hardness varying in inverse proportion to the diameter.

A gage consisting of two slightly diverging lines, the distance between which has been carefully measured and scaled off, is used to determine this diameter, although any standard lineal measuring device is applicable with varying degrees of accuracy.

My invention will be understood by references to the accompanying drawings, in which:—

Figure 1 shows the device partly in elevation and partly in central vertical section; Fig. 2 is a plan view of the device; Fig. 3 is a detail showing in section the spirit level used to locate the axis of the stem in a vertical direction; and Fig. 4 shows the form of gage or scale suitable for measuring the diameter of the dent.

Like parts are indicated by similar numerals throughout the several views.

1 represents a stem, preferably tubular in form for the sake of lightness, made of any material, such as steel. The lower end of this stem is screw-threaded, as at 3, to engage screw threads in the shoe 2. Besides being held by the screw threads, the said shoe may be rigidly fastened to the stem in any convenient way, as by the pin 4. A cap 5 is secured to the lower end of the shoe 2, as by means of screw threads, and a set screw 6. This cap 5 is provided with an opening to permit the projection therethrough of the hardened steel ball 7, which is revolubly mounted in said cap, and is free to turn in every direction therein.

At the other end of the tubular stem 1 is a cap 10 recessed at its upper end to receive the washer 17 and the flange 13 of the level 14, which is provided with any suitable liquid 15 closed in with a glass top 16. The flange 13 of the level is held under the annular flange 12 of the ring 11, which ring is screwed onto the cap 10, as shown in Fig. 1. The purpose of the level 14 is to locate the axis of the stem 1 in a vertical direction, so that when the weight 8 is allowed to drop, it will not bind on the sides of the stem 1.

In Fig. 4, I have shown a suitable gage with a V-shaped slot therein; the width of said slot in millimeters being indicated by the graduations 2, 2.5, etc., to 6, and the intermediate graduations show increments of the width of the slot in tenths of millimeters. This slot 21 has a suitable scale 20 of any material, such as celluloid, and may be mounted in a suitable frame, such as 22, but any other suitable gage may be used to measure the diameter of the dent.

The operation of the device is as follows:—The parts being assembled and in the position shown in Fig. 1, the weight 8 is lifted until it touches the bottom portion of the cap 10, and it is held in this position with the ball 7 on the surface of the material whose hardness is to be tested. The bubble is then brought into the center of the level, as by manipulating the stem, and when in the vertical position the weight is let fall, the cap 10 being at the same time held lightly between the fingers of the operator. The weight will fall until its bottom face strikes the upper face of the shoe 2, which will cause it to strike the shoe 2 with a hard blow, the predetermined magnitude or force of the blow depending upon the length of the stem 1 and upon the mass of the weight 8. This blow delivered to the shoe 2 will be transmitted to the hardened ball 7, and this ball will be partly driven into the substance whose hardness is to be determined.

By measuring the diameter of the dent made by the ball and comparing same with the table established by experiment with substances whose hardness has been determined, the hardness of the material being tested may be found.

By having the ball freely rotatable in the cap 5, it will not tend to wear or flatten at any particular portion; and by having the weight 8 tapered, as at 9, the resistance of the air and the weight may be in a measure reduced, but this latter is of minor importance.

It will thus be seen that I provide a cheap, simple and portable device, which may be used almost anywhere and under almost any conditions to determine the hardness of any material to be tested.

It will be obvious that various modifications might be made in the herein described apparatus, and in the combinations, constructions and arrangements of parts which may be used without departing from the spirit of my invention.

I claim:—

1. The combination with a stem, of a shoe carried by said stem, a hard metal ball revolubly mounted in said shoe and projecting beyond the base thereof, and a weight slidably mounted on said stem and adapted to strike said shoe and transmit the force of the blow to said ball, with means for locating the axis of said stem in a vertical line, substantially as described.

2. The combination with a stem, of a shoe carried by said stem, a hard metal ball revolubly mounted in said shoe and projecting beyond the base thereof, a weight slidably mounted on said stem and adapted to strike said shoe and transmit the force of the blow to said ball, a cap carried by the upper end of said stem, and a level carried by said cap and adapted to indicate when the axis of said stem is in a vertical line, substantially as described.

3. The combination with a hollow cylindrical stem, of a shoe carried by said stem, a cap carried by the lower end of said shoe, a hard metal ball revolubly mounted between said cap and said shoe and projecting beyond the base of said shoe, and a weight slidably mounted on said stem and adapted to strike said shoe and transmit the force of the blow to said ball, substantially as described.

4. The combination with a hollow cylindrical stem, of a shoe carried by said stem, a cap carried by the lower end of said shoe, a hard metal ball revolubly mounted between said cap and said shoe and projecting beyond the base of said shoe, and a weight slidably mounted on said stem and adapted to strike said shoe and transmit the force of the blow to said ball, with means for locating the axis of said stem in a vertical line, substantially as described.

5. The combination with a hollow cylindrical stem, of a shoe carried by said stem, a cap carried by the lower end of said shoe, a hard metal ball revolubly mounted between said cap and said shoe and projecting beyond the base of said shoe, a weight slidably mounted on said stem and adapted to strike said shoe and transmit the force of the blow to said ball, a cap carried by the upper end of said stem, and a level carried by said cap and adapted to indicate when the axis of said stem is in a vertical line, substantially as described.

In testimony whereof, I affix my signature, in presence of two witnesses.

WILLIAM HERBERT KEEN.

Witnesses:
HARRY F. CLARK,
E. D. GRAY.